United States Patent

[11] 3,578,785

[72] Inventor James A. Patterson
Los Altos, Calif.
[21] Appl. No. 707,016
[22] Filed Feb. 12, 1968
[45] Patented May 18, 1971
[73] Assignee Sondell Research & Development Co.
Palo Alto, Calif.

[54] OUTLET PLUG AND CONDUIT FOR CHROMATOGRAPH
11 Claims, 4 Drawing Figs.

[52] U.S. Cl. ...................................................... 210/198, 55/197
[51] Int. Cl. ...................................................... B01d 15/08
[50] Field of Search............................................ 210/31, 198, 282; 73/23.1; 55/67.197, 386

[56] References Cited
UNITED STATES PATENTS

| | | | |
|---|---|---|---|
| 2,989,443 | 6/1961 | Martin........................... | 55/67(X) |
| 3,334,514 | 8/1967 | Catravas......................... | 55/197(X) |
| 3,385,035 | 5/1968 | Dixmier et al. ................. | 55/386 |
| 3,422,604 | 1/1969 | Haase............................. | 55/386 |
| 3,436,897 | 4/1969 | Crowley......................... | 55/67 |

Primary Examiner—J. L. DeCesare
Attorney—Townsend and Townsend

ABSTRACT: A chromatographic conduit forming a channel through which a continuous stream of eluate or classified fluids pass with minimal destruction of the classified state. The conduit commences at the output of a chromatographic classifying column and comprises reactors for processing the classified fluids, interconnecting tubes for transporting the classified fluids, and plugs for accommodating unavoidable changes in overall conduit cross section. The reactor and plugs define fluid-containing volumes, which volumes are packed with spherical particles to define intercommunicating spaces therein. These defined intercommunicating spaces prevent the fluid interfaces contained within the eluate from being dispersed over large and unobstructed areas wherein mixing due to turbulence and molecular migration may freely take place. The conduit, including the interconnecting tubing and reactor, is provided throughout with an essentially constant, effective cross-sectional area for fluid flow, which area permits uniform velocity in the fluid stream and gradual and uniform pressure drop therethrough.

PATENTED MAY 18 1971 3,578,785
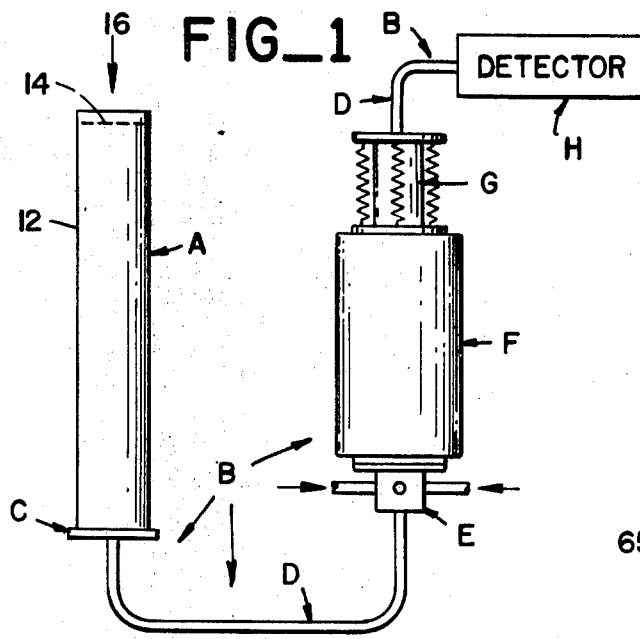
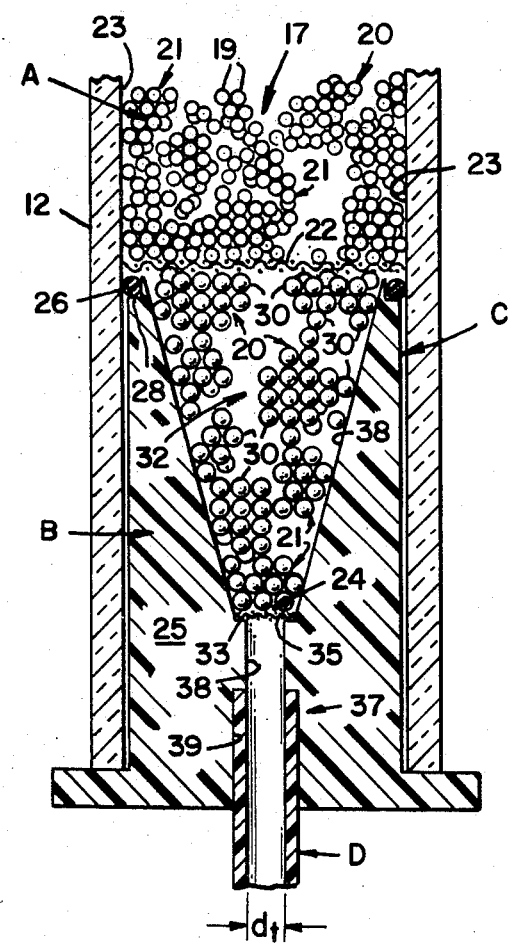
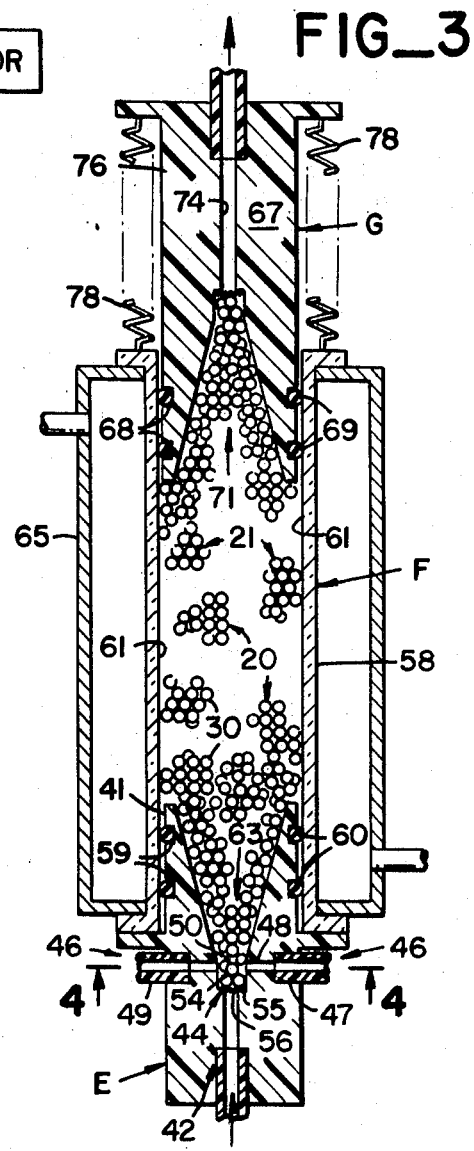
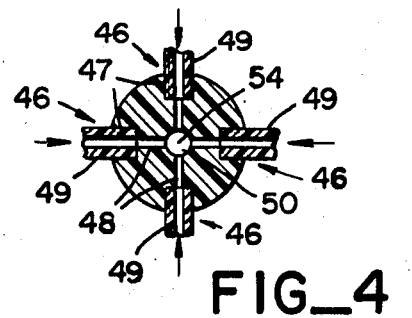
INVENTOR.
JAMES A. PATTERSON
BY
*Townsend and Townsend*
ATTORNEYS

OUTLET PLUG AND CONDUIT FOR CHROMATOGRAPH

This invention relates to chromatography, and specifically sets forth a chromatographic conduit through which classified fluids or eluate may pass in a continuous stream without destruction of the classified state.

Chromatography is a physical method of separation in which a mixture of components to be separated are distributed between two phases; one of these phases constituting a stationary bed of large surface area, the other of these phases being a carrying fluid that percolates through and along the stationary bed. This physical separation occurs typically in a classifying column having confined therein the stationary bed. The mixture to be classified is inserted at the top of this stationary bed and percolated therethrough in the carrying fluid. In passing over the stationary bed, the individual components of the mixture have varied attractions for the phases defined by the surface of the bed and the carrying fluid. These varied attractions selectively retard each individual component of the inserted mixture relative to the passing carrying fluid. Consequently, these components exit the classifying column in concentrated sequential batches or bands within the carrying fluid. Each of these bands typically comprises a pure component of the original mixture.

Upon exiting the classifying column, each classified band has a sharp delimitation or boundary between the remaining components of the original mixture. These delimitations or boundaries comprise fluid interfaces contained within a continuous stream.

When this continuous stream exits the classifying column, it is channeled through a chromatographic conduit for processing of the classified components. Such channeling must preserve the precise classification achieved by the chromatographic column in order to obtain accurate analysis or processing of the classified components. Accordingly, the present invention sets forth a chromatographic conduit, which conduit preserves to the greatest possible extent the precise delimitations and boundaries achieved by chromatographic separation and retains the fluids in their classified state for processing.

The interior of the disclosed chromatographic conduit defines sequential expanded volumes through which fluid passes. These volumes are located in the reactor for reacting the classified components with injected reacting fluids and in the plugs for accommodating unavoidable changes in overall cross-sectional area of the chromatographic conduit. Such volumes have in the past destroyed the classified state of the fluid stream by expanding the fluid interfaces to relatively unobstructed large areas. As expanded, the fluid interfaces have increased areas through which undesired mixing due to turbulence and molecular motion may take place.

To prevent such undesired fluid mixing, the present disclosure divides these fluid-containing volumes into a plurality of intercommunicating spaces. Such division is achieved by the insertion of homogeneously packed spherical particles of uniform dimension. As being homogeneously packed, the beads define therethrough a constant energy flow path free from effects of channeling and jet mixing. As being uniformly sized, the homogeneously packed particles divide the fluid-containing volumes into a plurality of intercommunicating spaces which spaces do not isolate or occlude any portion of the passing eluate.

Velocity variations due to the conduit configuration can further destroy the classified state of the passing eluate. When a fluid stream containing chromatographically classified components is channeled through a chromatographic conduit, and the conduit changes in the cross-sectional area available for fluid flow, undesired velocity variations occur in the fluid stream. These velocity variations result in acceleration and deceleration of the classified fluid with resultant destruction of the fluid interfaces originally produced by chromatographic classification. Further, relatively abrupt changes in the free space or area available for fluid flow create adjacent segments along the conduit having relatively large and abrupt variations in fluid pressure. These adjacent segments of large pressure drop induce and promote jet mixing in the resolved chromatographic stream. Such jet mixing occurs as the fluid stream rapidly moves from segments of the conduit having high pressure to adjacent segments of the conduit having low pressure.

Accordingly, this invention provides a chromatographic conduit where a continuous classified fluid stream may pass at substantially constant and unchanging velocity. This constant velocity flow is achieved by providing a conduit having an essentially constant effective cross-sectional area for fluid flow.

The chromatographic conduit of the instant invention is initially sized in cross-sectional area with respect to the exit of the classifying column. This exit defines an overall cross-sectional area for the flow of the chromatographic stream therethrough. This overall cross-sectional area of the exit is effectively obstructed in part by the classifying bed. The classifying bed in obstructing the column exit restricts the fluid flow therewithin. Such restriction of the fluid stream makes the combined column and bed act on the passing fluid the equivalent of an unobstructed column of much smaller cross section. This equivalent and small cross section is known as the effective cross-sectional area available for fluid flow.

Accordingly, the effective cross-sectional area available for fluid flow is first determined. Thereafter, the remaining elements of the chromatograph are sized equivalently with respect to the classifying column, so as to maintain a constant velocity for fluid flow throughout the conduit. Where such elements are unobstructed, the total area available for a fluid flow is equated to the effective cross-sectional area of the classifying column. Where these elements are obstructed, the effective area of such obstructed portions is likewise equated to the effective cross-sectional area of the classifying column.

Other features and advantages of the present invention will be more apparent upon reading the following specification and referring to the accompanying drawing in which:

FIG. 1 is a schematic of a laboratory analytical chromatographic system including a chromatographic classifying column and connected chromatographic conduit, which conduit comprises a reacting column, a detector, and interconnection tubing;

FIG. 2 is an elevation section taken axially of the outlet of a cylindrically shaped classifying column and connected bed outlet plug illustrating the interior of the plug packed with uniformly sized spherical particles;

FIG. 3 is an elevation section taken axially of a reacting column and attached inlet and outlet plugs, showing the inlet plug structure for intermixing reacting fluids with the chromatographically classified fluid stream and outlet plug structure for varying the length of the reacting column; and, FIG. 4 is a cross section taken through the inlet plug of the reactor at line 4-4 of FIG. 3 illustrating the configuration of the opposing jets for inserting reacting fluid interior of the classified stream.

With reference to FIG. 1, a laboratory analytical chromatographic system is illustrated. This chromatograph system includes a classifying bed A and a connected chromatographic conduit B. Conduit B in turn comprises bed outlet plug C, interconnecting tubing D, reactor inlet plug E, reactor F, reactor outlet plug G and detector H. The illustrated analytical chromatograph system is of the type commonly used to classify a fluid mixture and thereafter analyze such mixtures both quantitatively and qualitatively for research purposes.

Regarding the function of the analytical chromatographic system, chromatographic classification of the fluid mixture takes place in classifying bed A. Thereafter the classified fluids are transported in a continuous fluid stream through conduit B to reactor F. At the entrance of reactor F, reacting fluids are injected into the classified fluid stream through reactor inlet plug E. This reacting fluid chemically interacts with chromatographically classified fluid stream responsive to the classified components therein, changing the physical properties of the stream (typically the color). Thereafter the fluids are channeled through tubing D to detector H, where the detector senses the distinguishable bands of chromatographically classified fluids effecting the desired analysis.

Chromatographic classification in the analytical chromatographic system is achieved initially in the classifying column 12. Classifying column 12 is typically a hollow elongate cylinder of glass, containing classifying resin bed 17. Bed 17 is here shown comprising spherical resin particles 19, which are supported at the bottom of the classifying column on bed outlet plug C.

To obtain chromatographic classification a fluid mixture 14 is inserted at the top portion of the classifying resin bed 17. Thereafter, a carrying fluid 16 is percolated through bed 17 from the top to the bottom of column 12. As the carrying fluid passes through the bed, chromatographic classification occurs. Such classification results from the varied physical attractions of carrying fluid 16 and resin bed 17 for the components of the original fluid mixture. Typically, the components each travel through the classifying column 12 at varied rates, migrating between the two phases defined by carrying fluid 16 and resin bed 17.

Upon traversing the entire length of the classifying column A, the original fluid mixture exits or leaves the classifying column in bands with a continuous stream of eluate. These bands comprise individually classified groups or batches of each individual component of the original mixture contained within the fluid stream, separated by fluid boundaries or interfaces. These interfaces within the continuous fluid stream must be channeled through chromatographic conduit B without intermixture so as to preserve the classified fluid state.

With reference to FIG. 2, a segment of the chromatographic conduit B is illustrated, which segment commences at the outlet of the classifying column 12 and interconnects to transporting tubing D through bed outlet plug C. Outlet plug C defines a frustoconical interconnecting volume 32 which volume defines the conduit B between the outlet portion of classifying column 12 and the inlet portion of interconnecting tubing D. This volume 32 is a fluid containing segment of the conduit B of relatively large volume wherein mixing of the classified fluids could occur.

The frustoconical interconnecting volume 32 commences immediately below resin insulating screen 22 with a relatively large and circular cross section and tapers in a linear and converging fashion into the vicinity of tubing inlet 24. At tubing inlet 24 there is provided a screen supporting step 33 which step has placed thereon inlet screen 35. Packed between resin insulating screen 22 and inlet screen 35 there are spherical particles 30.

Spherical particles 30 are selected to have a uniform attraction to the passing eluate. This uniform attraction does not vary the relative positions of the classified components within the fluid stream.

Additionally, particles 30 are selected so as not to absorb or adsorb the passing eluate in appreciable quantities. This absence of absorption or adsorption prevents the particles from retaining increments of the classified components and thus destroying the classified fluid state.

Particles 30 are here shown comprising a special high cross-linked bead of uniform dimension uniformly packed within interconnecting volume 32. These beads can be of many varied compositions. Sulfonated beads have been found satisfactory. Additionally, particles 30 can be prepared so as to be hydrophylic without chemical bonding to the classified eluate when utilized within the scope of the present invention. As packed within volume 32, these particles function in three separate ways to prevent intermixing of the passing classified stream.

First and primarily, spherical particles 30 divide the fluid-containing volume of frustoconical volume 32 into continuous and intercommunicating spaces. These intercommunicating spaces break up and interrupt the fluid interfaces passing through volume 32 preventing unrestricted mixing of the fluid stream due to molecular motion and turbulence. Such division is achieved by the controlled or homogenous packing of uniformly sized particles 30 interior of the volume between screens 22 and 35. As homogeneously packed, the particles define therethrough a constant energy flow path, which path is free from channeling and jet mixing. In avoiding channeling, no one portion of the packed beads within volume or aperture 32 defines a path wherein the majority of fluid flow occurs. In avoiding jet mixing, no one portion of the packed beads defines areas of rapid pressure drop in the passing fluid stream.

Secondly, spherical particles 30 through their capillary attraction with the passing fluid stream provide a pressure drop throughout the length of the conically shaped aperture, which pressure drop is substantially independent of that pressure drop produced by the friction of fluid flow. Regarding this pressure drop, the spherical particles typically have a capillary attraction to the passing fluid stream. This capillary attraction exists whether or not the stream is moving through the chromatographic conduit. Consequently, such attraction is independent of back pressure due to fluid friction between the passing fluid stream and the changing cross-sectional area within the frustoconical shaped aperture. As exceeding this pressure drop, the capillary attraction prevents fluid friction created by the changing cross-sectional area from intermixing the classified fluid state.

Thirdly, packed spherical particles 30 assist in preserving the fluid interfaces within the classified fluid stream by varying the rate of fluid flow to compensate for the deformation of such interfaces in passing through frustoconical aperture 32. Regarding this deformation, the interfaces when they depart classifying column 12 comprise circular areas of planar cross section. When such planar and circular interfaces flow through conically spaced aperture 32, individual increments of the interfaces traverse nonequal distances through the interconnecting volume 32 which nonequal distances are dependent upon the radius of such increments from the axis of the conically shaped aperture.

This traverse of nonequal distances may be best understood by comparing the traverse of an axial increment of such a fluid interface with a radial or peripheral increment of such interface, as the entire interfaces traverses conically shaped aperture 32. A medial increment traverses the conical volume along a relatively short distance, which distance is defined by the axis of the frustoconical fluid-containing volume. The peripheral increment of such an interface, however, must traverse a relatively large distance along the walls of the cone. Assuming that both increments, medial and peripheral, traverse the conically shaped aperture 32 at the same rate, the peripheral portions of the fluid interface would be retarded with respect to the medial portion of the interface when the fluid stream enters interconnecting tubing D.

Conically shaped volume 32 utilizes packed spherical particles 30 within such volumes to speed the traverse of the peripheral portion of such fluid interfaces, thereby compensating for the larger distances traveled by the peripheral increments through such frustoconical volumes. These spherical particles when packed adjacent a wall define intercommunicating spaces which have slightly decreased resistance to fluid flow. This decreased resistance defines a slightly lower energy fluid path adjacent the walls and enables those increments of the fluid interfaces along the wall to travel at a greater rate than increments of the interfaces passing through the medial portion of the conically shaped aperture. Accordingly, when the classified fluid stream is passed through the conical-shaped aperture 32 at a constant fluid pressure, the peripheral portions of such interfaces traverse such apertures at a faster rate, which compensates for the additional distance such increments must traverse. This compensating rate assures that all increments of the fluid stream pass through volume 32 in the same interval of time, thereby preventing fluid intermixing.

It has been found that the variation in velocity of a fluid flow adjacent a boundary of a frustoconical aperture varies dependent upon the size of the spherical particle packed within such a bed and the slope of the cone relative to the path of fluid flow. This rate of fluid traverse varies within such volumes a distance equal to three particles diameters from the conical walls. Accordingly, the rate of interface traverse may be adjusted by varying both the slope of the conically shaped aperture relative to the direction of fluid flow, and the particle size used to pack the frustoconical fluid-containing volume 32. In the present example, it has been found that the particles of 1.07±0.10 millimeters in diameter packed within a conical aperture having 30° of slope between the axis of fluid flow and the sidewalls thereof, effectively compensates the distortion of fluid interfaces between a classifying column 12 and the interconnecting tubing D.

Outlet plug C, in addition to defining a fluid-containing volume supports resin bed 17 interior of column 12 through insulating screen 22. Such support is accomplished by the screen in cooperation with the particles 30 and the frustoconical volume 32.

Screen 22 is circular in shape and has a mesh with a minimum size sufficient to insulate spherical resin particles 19 to classifying resin bed 17. Typically, screen 22 is cut to have a diameter slightly exceeding the inside diameter of classifying column 12. With such an oversized diameter, screen 22 compresses against the interior sidewall 23 of column 12 forming a firm resin insulating seal with such walls so as to isolate the particles of classifying resin bed 17 from the chromatographic conduit B. As can be seen in FIG. 2 this oversizing of the screen additionally imparts a slight concave configuration to the screen, which concave configuration results from the compression of the insulating screen along interior sidewall 23.

Screens similar to resin insulating screen 22 can be a source of interference with the fluid flow through the chromatographic conduit. Typically, such screens are mounted immediately over the inlet portion of the interconnecting tubing D. As mounted adjacent the inlet portion of such interconnecting tubing, the fluid pressure on the screen exerted by the passage of the fluid stream through the spherical resin particles 19 combined with the weight of such particles deforms the screen from its installed concave configurator to a convex configuration. In this convex configuration, the medial portion of resin insulating screen 22 immediately overlies the inlet to the transporting tubing. In such a deformed convex configuration, fluid flow through the screen is restricted to the reduced area of the screen which immediately overlies the entry to the transporting tubing. This causes undesired acceleration of the fluid stream, adjacent segments in the chromatographic conduit having relatively large pressure drop, and severe pressure behind the screen within the classifying column A. Such severe pressures frequently crack or otherwise destroy the column when carrying fluid 16 is forced therethrough.

The classifying column outlet plug C of the present invention provides a separation between the resin insulating screen 22 and the interconnecting tube inlet 24 to prevent any possible deformation of resin insulating screen 22 into an obstructing position. Furthermore, resin insulating screen 22 is supported by spherical particles 30 between the screen and tube inlet so as to prevent such deformation of the screen 22 overlying the interconnecting tubing inlet.

Regarding the peripheral construction of outlet plug C as illustrated in FIG. 2, the connector comprises a plug body 25. Plug body 25 is circular in cross section having a diameter slightly less than the inside diameter of classifying column A. At the top portion of the plug body there is configured a diametric seal groove 28, which groove has seated therein immediately underlying resin insulating screen 22 and a seal ring 26. Seal ring 26 has an inside diameter slightly less than the outside diameter of seal groove 28 and when mounted on this groove has an overall outside diameter slightly in excess of the inside diameter of the classifying column.

As installed in the bottom portion of classifying column 12 plug body 25 is sealed in relation to the interior sidewall 23 by the cooperation of the seal ring 26 with the seal ring groove 28. Typically, the screen 22 is first inserted in the column, and thereafter the plug body 25 with the seal ring 26 force upwardly interior of the classifying column A. In such forcing, seal ring 26 elastically conforms to the inside dimension of classifying column A forming a seal in cooperation with the walls of the column.

Plug C is coupled to the interconnecting tubing D at tubing aperture 37. Tubing aperture 37 comprises a tube inlet bore 38 and a tube retaining bore 39. Tube inlet bore 38 has an inside diameter equal to diameter $d_t$ of the interconnecting tubing D and the bore is configured axially of the cylindrically plug body 25 interconnecting the tubing D with the bottom narrow section of frustoconical volume 32.

Tube retaining bore 39 is configured having an inside diameter slightly less than the outside diameter of tubing D. Typically, tubing D is forced or glued interior of tube retaining bore 39 so that a union occurs between the outside diameter of the tubing D and the inside diameter of the tube retaining bore 39. As frictionally held within the tube retaining bore, the inside diameter of the inner connecting tubing D in cooperation with tube inlet bore 38 forms a continuous and smooth surface along the boundary of the chromatographic conduit B.

To prevent intermixture within chromatographic conduit B, the classified fluid stream must have a constant velocity flow therethrough. Such a constant velocity flow is maintained by preserving a constant effective cross-sectional area available for fluid flow wherever possible throughout the length of the conduit B.

Regarding this constant effective cross-sectional area, chromatographic conduit B has unobstructed segments of relatively small overall cross-sectional area in interconnecting tubing D and obstructed segments of relatively large overall cross-sectional area defined by the plugs C, E and G, and reactor F. The obstructed segments of conduit B have uniform and packed spherical particles. These particles give these relatively large cross-sectional portions of the conduit increased resistance to fluid flow, which increased resistance makes such packed segments act upon the passing fluid stream the equivalent of the unobstructed segments of substantially smaller cross section. This equivalent resistance to fluid flow may be expressed in terms of an effective cross-sectional area available for fluid flow, which effective cross-sectional area equates all obstructed portions of the conduit to imaginary unobstructed conduit segments of substantially decreased cross-sectional areas.

The chromatographic conduit of the present disclosure is sized with respect to the exit portion of classifying column 12. Such sizing of the chromatographic conduit may be best understood by first describing the exit portion of a classifying column 12 which is packed with spherical particles and thereafter setting forth the procedure by which the chromatographic column is sized.

The exit portion classifying column 12, has a circular cross section normal to fluid flow and has its interior volume packed with a classifying resin bed 17. Classifying resin bed 17 is shown here comprising spherical particles 19. Typically such particles are spheroidal in shape and comprise styrene crosslined with divinyl benzene, which particles are between 10 and 20 microns in diameter. Such spherical particles or beads may be obtained under the trade name Micules, a registered trademark of Microspheres, Inc.

Spherical particles when packed interior of column A and the remaining volumes of the analytical chromatograph effectively obstruct a portion of the circular cross section available for fluid flow throughout the entire length or height of the classifying column. This effective obstruction of the spheroidally packed segments of the classifying column and connected chromatographic conduit is dependent upon the particular geometric configuration in which the particles are packed.

Typically, such packing is controlled to effect a solidly packed bed of spherical particles without open or void spaces therein, (it being noted that the open spaces in such packing illustrated in the attached drawings are solely for purposes of making the numerical designations clear). Such controlled packing varies between two extremes: orthorhombic packing, which represents the geometric configuration having the greatest special separation and least effective blocking; and tetragonal packing, which represents the geometric configuration having the least spacial separation and greatest effective blocking. These two packings are shown in the side elevation views of FIG. 2 and 3 as packing area 20 and 21 respectively.

Orthorhombic spheroidal packing is illustrated in packing area 20 of exit column A. This packing area when viewed in cross section appears with the individual spherical particles immediately overlying one another. Such packing when in its extreme and open disposition occupies 47.6 percent of the total volume and effectively obstructs 78.5 percent of the total cross-sectional area leaving 21.5 percent of this cross-sectional area available for fluid flow.

Tetragonal spheroidal packing illustrated in cross section in packing area 21. This packing configuration has the spheroidal particles with the sphere centers in each layer of beads overlying the point of contact between the spheres in the layer immediately below. This tetragonal packing occupies approximately 74 percent of the total packed volume and effectively obstructs 90.7 percent of the total cross-sectional area available for fluid flow, leaving 9.3 percent of this cross-sectional area effectively available for fluid flow.

Regarding the actual packing of classifying column A, such controlled packing occurs in random configurations, which random configurations pack the column in between the extremes of orthorhombic and tetragonal spheroidal packing. When a particular classifying column A is packed with such spherical particles, the effective cross-sectional area available for fluid flow can be obtained.

Assuming that both the diameter and volume of a classifying column A are known, the column is first packed with its spherical particles. The effective unobstructed or cross-sectional area available for fluid flow through such packing thereafter may be obtained by first measuring the displacement effected within any given, packed volume and thereafter proportioning the obtained volume to obtain the effective cross-sectional area available for fluid flow.

Assuming a 9-millimeter diameter classifying column A, the overall cross-sectional area for fluid flow normal to the passing fluid stream will be 63.6 square millimeters. Assume further that when the column 12 is packed with classifying particles occupying approximately 65 percent of the total volume of column A, leaving 35 percent of this volume unobstructed.

Once the percentage of volumetric obstruction has been determined, the effective obstruction of the cross-sectional area available for fluid flow may be proportionated by the mean difference method using the following equation:

$$\frac{dV}{dVm} = \frac{dA}{dAm}$$

where:

$dV$ is the total change in unobstructed volume between the extremes of orthorhombic and tetragonal packing in volume by percent, $dVm$ is the difference in obstructed volume between a perfectly packed tetragonal configuration and the measured cylinder volume as actually packed, $dA$ is the total change in percent of area available for fluid flow between a loosely packed orthorhombic spheroidal packing and perfectly packed tetragonal spheroidal packing, and, $dAm$ is the desired effective unobstructed cross-sectional area of the classifying column A. Substituting the total change in volume between the two extremes of spheroidal packing of 21.6 percent for $dVm$, the total change in effective obstruction of the cross section available for fluid flow of 12.2 percent for $dAm$, and the obtained volumetric displacement of 35 percent of $dV$, the effective obstruction of cylinder 12 will be found to be approximately 14.38 percent of all but 9.15 square millimeters will be obstructed by the packed resin particles 19.

Having obtained an effective area available for fluid flow, $A_e$, the remainder of the chromatographic conduit must be sized with respect thereto. For example, assuming that transporting tubing was to be used, which transporting tubing is completely unobstructed, the area of such tubing should be equal to effective cross-sectional area available for fluid flow $A_e$. Similarly, all screens, valves, and other fittings throughout the conduit should have the same ares available for fluid flow $A_e$.

It should be noted at this juncture that classifying column A has been described as having resin particles 19. These particles have been described as being considerably smaller (between 10 and 20 microns) than the spherical particles 30 (between 1.07 —0.10 millimeters) packing the fluid-containing volumes of conduit B. The effective cross-sectional area of a spherically packed volume is independent of the size of such particles (the only limitation being that the particles must be less than one-sixth the dimension of the smallest cross section into which they are packed). The effective cross-sectional area A for the remaining fluid-containing volumes throughout the chromatographic conduit B can be determined by the same technique utilized for the exit portion of column A.

Once the chromatographic stream has traversed the juncture between the classifying column A and the tubing D, it is typically communicated to reactor F via the interconnecting tubing. As communicated to reactor F, the classified stream of eluate first enters reactor inlet plug E where it is intermixed with reacting fluid, and thereafter the eluate is maintained interior of reactor F for a period of time necessary to complete the desired chemical interaction.

Intermixture of the reacting fluid with the passing fluid stream is accomplished at intermixing reactor connector E, which connector receives the chromatographically classified fluid at the bottom portion thereof in the proximity of tubing aperture 42. Similar to tubing aperture 37 of plug C, aperture 42 accommodates interconnecting tubing D and in cooperation with such tubing provides a constant diameter cross section for the chromatographic conduit, which cross section is maintained essentially constant until the injecting portion 44 of the reactor connector E.

Injection of reacting fluid interior of the passing chromatographically classified fluid stream is accomplished by a plurality of opposing jet apertures 46 within reactor inlet plug E. As shown in FIG. 3 and illustrated specifically in the section view of FIG. 4, opposing jet apertures 46 comprise a tube connection 47 and a jet inlet 48. Tube connection 47 receives therein reacting fluid communicating tubing 49, which tubing supplies reacting fluid under a constant pressure and temperature to each of the four opposing jet apertures 46. Such reacting fluid is supplied typically by a reacting fluid manifold (not shown) which manifold distributes reacting fluid at constant temperature and pressure to tubing 49 and thereafter to each jet aperture 46 under equal pressure.

Each of the opposing jet apertures 46 will channel respective fluid through jet inlets 48 interior of the intermixing aperture 50. Intermixing aperture 50 is packed with reactor beads 30 and provides a section of the chromatographic conduit wherein the opposing jets intersect one another to cancel their inlet velocity relative to the passing fluid stream.

Regarding the intersection of jets of reacting fluid through opposing jet apertures 46, each of the four jet inlets 48 are directed axially toward one another so as to intersect at a common point of intersection 54. As intersecting at this common point 54, the jets of reacting fluid cancelled their respected inlet velocity normal to the axis of conduit B. This cancellation of inlet velocity permits minimal disturbance of the passing fluid stream due to the original velocity of injection of the rejecting fluid and balances the disturbance caused by such injection on the interfaces of the passing fluid stream.

It will be noted that the present disclosure illustrates the use of four jet apertures directed towards one another at 90°. As is apparent, the number of opposing jet apertures 46 may be varied, so long as the jets intersect one another at equal angles so as to cancel their respective fluid velocity normal to the flow of the classified fluid stream.

The opposing jets in injecting reacting fluid interior of the fluid stream create turbulence. If unrestricted, such turbulence could substantially destroy the classified state of the passing eluate. Reactor inlet plug E confines such turbulence to intermixing aperture 50, which intermixing aperture is packed with spherical particles 30. These spherical particles 30, similar to the spherical particles 30 of connecting plug C, define continuous intercommunicating spaces within the intermixing aperture 50. These spaces confine and arrest the turbulence created by the injected reacting fluid to a relatively small segment of the chromatographic conduit B and dampen such fluid disturbance after the requisite intermixture as the classified fluid stream passes from the intermixing aperture 50 to the interior of the reactor F.

Opposing jet apertures 46 also serve to both utilize and balance the pressure drop across the intermixing aperture 50 created by particle insulating screen 56. Typically, the intermixing aperture is provided at the bottom portion thereof with a screen step 55 having a particle insulating screen 56 mounted directly thereon. Particle insulating screen 56 prevents the spherical particles of the reactor from obstructing segment of the chromatographic conduit B defined by the transporting tubing D and tubing aperture 42. In preventing such obstruction, insulating screen 56 tends to create some turbulence and pressure drop within the passing field stream immediately before it enters intermixing aperture 50. Opposing jets 46 utilize such turbulence to effect complete intermixture of the reacting fluid by their immediate proximity to particle insulating screen 56. Furthermore, the opposing jets by intersecting at common point of interception 54 balance the pressure drop across insulating screen 56 by the intersection of their fluid streams, providing an essentially constant and gradual pressure drop throughout intermixing aperture 50.

Once the classified chromatograph stream is intermixed with injected reacting fluid interior of intermixing aperture 50, the fluid stream must be communicated into the interior of reactor F. Reactor F comprises a reactor column 58 which column is circular in cross section and is filled with spherical particles 30. This reactor is chosen with an overall cross section available for fluid flow $A_e$, which area compensates for the increased fluid flow due to the injection of the reacting fluid.

Regarding this compensation in the area of reactor column 68, the classified fluid stream between the outlet of classifying column A and intermixing aperture 50 of reactor F contains a constant and known flow rate. In intermixing aperture 50, however, additional reacting fluid was inserted within the chromatographically classified fluid stream. As such fluid is inserted, the volume flow rate of the stream must increase so as to maintain a constant velocity flow throughout the length of the chromatographic conduit B. Accordingly, to accommodate the increased volume of the classified fluid stream having the reacting fluid injected and intermixed therewith, the cross-sectional area of the reactor F must exceed the cross-sectional area of the classifying column 12. Such increase in area is directly proportional to the increase of volume flow so as to maintain the same rate of flow in the eluate throughout the chromatographic conduit. Assuming that a 9-millimeter diameter reacting column 12 is used with a fluid stream having injected therein one part reacting fluid for each two parts of the classifying stream, the desired cross-sectional area of the reacting column $A_e$ would be 95.3 square millimeters (if both reacting column 58 and classifying column 12 have spherical particles of indentical packing configuration). Such a column would have a diameter of approximately 11 millimeters.

Having determined the diameter of the reacting column necessary to maintain a constant velocity flow, the remainder of the reactor inlet plug E may be described. Similar to bed outlet plug C, inlet plug E has the periphery of its reactor connector body 41 configured with a diameter slightly less than the inside diameter of reacting column 58. This body has peripherally thereof paired seal ring grooves 58 and seal rings 60 which grooves and seal rings cooperate with the sidewalls 61 of the reactor column to effect a fluid seal.

Axially of the cylindrical portion of reactor connector E there is a conically shaped aperture 63. This conical-shaped aperture communicates intermixing aperture 50 with the interior diameter of reacting column 58. Constructed identically to conically shaped aperture 32 of bed outlet plug C, conically shaped aperture 63 is packed with particles. This aperture as packed defines intercommunicating spaces, which spaces provide an even pressure drop therethrough and compensates for the differing distances which the peripheral and medial portions of the fluid interfaces must travel in expanding across this volume.

Once the classified fluid stream with the intermixture reacting fluid is interior of reactor F, reaction between the classified components and the injected reacting fluid may take place, Typically, such reaction must occur in an ambient temperature, which temperature is essentially constant throughout the length of the reactor. To provide such a temperature ambient there are surrounding reactor column F heat exchanging jacket 65, which jacket maintains a constant ambient temperature interior of the reactor column through contained heat exchanging fluid therein.

In addition to supplying the requisite ambient temperature, reactor F must maintain all increments of the passing fluid stream at such temperature over a sufficient interval of time for reaction to occur. Accordingly, reactor column 58 must have a height which defines a volume within reactor F sufficient to maintain all increments of the passing fluid within the reactor for the necessary reaction time.

Assuming that a 10-minute retention time is desired in the reacting column having a total cross-sectional area of 95.3 square millimeters with a flow rate of approximately 120 milliliters per hour and a packing fraction or unobstructed portion of approximately 35 percent, the desired height of the reacting column would be 54.5 centimeters.

Reactor F as packed with spherical particles has an advantage not immediately apparent. It has been common in the past to allow intermixture of reacting fluid in helical coils of tubing which tubing was given a length to effect the desired retention time. As passed through such elongate segment of reacting tubing, the classified state of the fluid stream frequently deteriorated due to the friction between the sidewalls of the reactor tubing and the flowing classified fluid stream.

The reactor F of the present invention includes a reactor column 58, which column has contained therein intercommunicating spaces defined about packed spherical particles 30. Unlike the elongate tubing coils of reactors of the prior art, these intercommunicating spaces define a minimal effective cross-sectional area available for fluid flow while retaining relatively large volumes of the classified fluid stream within the reactor F.

Regarding the effective cross-sectional area obstructed by a volume packed with spherical particles, it will be remembered that such effective obstruction may be determined by measuring the displacement of the packed spherical particles within any given volume. As this displacement relates to the obstructed volume, it will be noted that the effective unobstructed cross-sectional area in percent is less than one-half of the volume occupied in percent by the packed spherical particles. For example, in the example previously illustrated, when the packed spherical particles occupies 35 percent of the total volume of classifying column 12, they obstructed 14.38 percent of the effective cross-sectional area available for fluid flow. Similarly, for orthorhombic spheroidal packing of the extreme open variety 47.6 percent of the volume was left unobstructed while 21.5 percent of the cross-sectional area available for fluid flow was unobstructed. Tetragonal spheroidal packing occupied all but 26 percent of the packed volume but effectively obstructed 9.3 percent of the cross-sectional area available for fluid flow.

As is apparent, a column having a relatively small cross-sectional area available for fluid contains therein relatively large volumes of fluid for all variations of spheroidal packing. Accordingly, these relatively large volumes of fluid retained within such interlocking volumes permit the classifying column 12 to occupy a minimum segment of the chromatographic conduit B. This small or minimum segment of the conduit substantially eliminates destruction of the classified fluid state as experienced with the long tubing coils of the prior art.

Reactor F has an additional function which is not immediately apparent. When reacting fluid is inserted interior of the passing classified fluid stream, a chemical reaction occurs, which reaction typically emits a gaseous byproduct in some form (an example of such gaseous reaction would be the production of a carbon dioxide byproduct from the reaction of ninhydrin reacting fluid with classified amino acids). In emitting such gaseous by-products, the chemical reaction frequently disturbs the classified state of the chromatographic stream by exerting forward and reverse pressures on the eluate within the chromatographic conduit. These pressures result in undesired velocity changes within the fluid stream. Particles 30 mitigate the disturbance of this chemical reaction in two separate ways.

First, particles 30 defining the intercommunicating spaces immediately arrest any irregular velocities created by the emission of such gaseous byproducts within the chromatographic stream.

Secondly, virtually all particles 30 when immersed within fluid mixture 14 and carrying fluid 16 have been found to have their periphery covered by a minute boundary of gas. This minute boundary tends to absorb and release gases produced by the chemical reaction of the injected reacting fluid and the classified components. These gas boundaries distribute the gases uniformly throughout the fluid stream by absorbing the gaseous byproducts in segments of the fluid stream where such gases are present in concentrated amounts releasing such byproducts when segments of the fluid stream pass having little or no gaseous byproducts therein.

When differing fluid mixtures are analyzed within any given laboratory analytical chromatograph, it will become necessary to maintain the increments of the passing fluid stream at the temperatures of reaction for varied intervals of time. To accommodate such varied retention times, it is often necessary to vary the total height of the reacting column dependent upon the particular flow rate utilized and desired retention time in reactor F. Accordingly, the reactor F of the present invention is equipped with an expansible reactor exit plug G, which plug permits column 58 to be readily variable in length.

Exit plug G comprises an elongate and cylindrical plug body 67. Body 67, similar to the reactor connector body 41, has an outside diameter slightly less than the inside diameter of the reactor column 58. This plug has configured circumferentially about the bottom portion thereof paired seal ring grooves 68 and paired seal rings 69, which grooves and rings effect a compressive seal in cooperation with the reactor column side wall 61. Interior of the plug and proximate the reactor column adjoining end thereof there is a conical-shaped aperture 71 which aperture is similar in function to the conical-shaped aperture 32 of bed outlet plug C. This aperture, defining an area where change in the overall cross section available for fluid flow must take place, channels the classified fluid stream from the interior of the reactor F to the tubing D wherein the chromatographically classified and reacted fluid stream exits reactor F. Tubing D is connected to the conical-shaped aperture 71 by tubing aperture 74, which aperture maintains the connection between the tube D and the plug G in a manner precisely identical to tubing aperture 37 of cone connector C.

To vary the total height $h_r$ of reacting column 58, reactor outlet 58 is fitted with an elongate cylindrical shank 76, which shank is slideable axially interior of reactor F so as to vary the total length thereof. Typically, the reactor column 58 is filled with a volume of spherical particles 52 which volume will produce desired reactor height $h_r$. Thereafter, reactor exit plug G is inserted on top of such beads and firmly held by springs 78 to effect the desired length of the reacting column. When change in reactor height $h_r$ is desired, exit plug G is removed and spherical particles either inserted interior of the reactor or removed therefrom to lengthen or shorten, respectively, reacting column 58.

Once the classified fluid stream has been reacted interior of column F is exited to reacting tubing D, which tubing is connected to reactor plug G. Similar to the reactor column 58, the tubing D connected to reactor exit plug G may be increased in size so as to maintain a constant and uniform velocity throughout this section of the chromatographic conduit.

After exiting the reactor F the classified fluid stream is channeled to detector H. Detector H, dependent upon its structure may or may not require changes in the overall cross-sectional area available for fluid flow. If such changes are required, connecting fitting similar to plugs C, E and G are constructed in accordance with the principles of this disclosure.

The foregoing invention has been described utilizing the example of a laboratory analytical chromatographic system. It is believed apparent that these same principles may be applied to other processes associated with chromatography, the only limitation being that the chromatographic conduit through which the fluids flow be constructed in accordance with the illustrated principles. Similarly, the foregoing invention in the entirety has been described in some detail by way of illustration and example for purposes of clarity and understanding. It is understood that certain changes and modifications may be practiced within the spirit of the invention as limited only by the scope of the invented claims.

I claim:

1. In an analytical chromatograph wherein a classifying column having a first overall cross-sectional area for fluid flow is obstructed by a classifying bed to define an effective cross-sectional area available for fluid flow, a chromatographic conduit having an inlet and outlet; a reacting column; said inlet of said conduit connected to the output of said classifying column, said outlet of said conduit connected to the inlet of said reacting column; a fluid stream being passable through said classifying column and said conduit to traverse the effective cross-sectional area of said classifying column at a first velocity, said chromatographic conduit comprising: interconnecting tubing having an overall cross-sectional area approximately equal to said effective cross-sectional area; said reacting column having an overall cross-sectional area obstructed by particles, said particles defining intercommunicating spaces within said reacting column without occlusion of said spaces; means for injecting said reacting fluid interior of the fluid stream passed therethrough at the inlet of said reacting column; said reacting column in cooperation with said particles defining an effective cross-sectional area which area maintains said first velocity of said fluid stream and injected reacting fluid therethrough.

2. In an analytical chromatograph according to claim 1 and wherein: said particles are spherical in shape.

3. In an analytical chromatograph according to claim 1 and wherein: said injecting means includes an intermixing volume defining means connected to said interconnecting tubing at a first end and to said reactor column at a second end and defining a shape therebetween for passing said fluid stream from said first end to said second end; said intermixing volume defining means having a plurality of opposing jet apertures; means for supplying reacting fluid to each said jet aperture; said jet apertures axially aligned with respect to said passing fluid stream for imparting velocity to said reacting fluid, which velocity is normal to said fluid stream; said opposing jet apertures directed to a common point of intersection interior of said intermixing volume for canceling said velocity normal to said fluid stream.

4. In an analytical chromatograph according to claim 1 wherein: said reacting column includes means for varying the length of said column; said means including a plug at one end of said reacting column, which plug is slideable axially with respect to said column.

5. A chromatographic conduit for receiving eluate containing chromatographically classified components therein, from a packed classifying column of a first diameter, said conduit comprising: a tube within said chromatographic conduit of a second and reduced diameter; a plug body defining a fluid-containing volume fluidly communicating said column at one end and said tube at the other end; said volume defined by the plug body having a diameter approximately equal to said first diameter adjacent said column and a diameter approximately equal to said second diameter adjacent said tube and further having a truncated frustoconical shape; uniformly sized and shaped particles packing said fluid-containing volume to define nonoccluded intercommunicating spaces therein; and means for retaining said particles interior of said fluid-containing volume.

6. In a chromatographic conduit according to claim 5 wherein said particles are spherical in shape.

7. A chromatographic conduit according to claim 5 wherein said particles are spherical and of a diameter in the range between 0.97 millimeters and 1.17 millimeters and the slope of the walls of said frustoconical volume with respect to the axis thereof is approximately 30°.

8. A chromatographic conduit according to claim 5 and wherein: said retaining means includes a screen between said packed particles and said tube.

10. A chromatographic conduit according to claim 9 and wherein: said screen adjoins the inside walls of said column.

9. A chromatographic conduit according to claim 5 and wherein: said retaining means includes a screen between said packed particles of said fluid-containing volume and said packed particles of said column.

11. A chromatographic conduit according to claim 10 and wherein: said screen is cut to a dimension slightly exceeding the inside dimension of said column.